(12) United States Patent
Jiang et al.

(10) Patent No.: US 12,401,572 B2
(45) Date of Patent: Aug. 26, 2025

(54) NETWORK SIMULATION METHOD AND APPARATUS, DEVICE, AND COMPUTER-READABLE STORAGE MEDIUM

(71) Applicant: Huawei Technologies Co., Ltd., Shenzhen (CN)

(72) Inventors: Zhongping Jiang, Beijing (CN); Hua Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 332 days.

(21) Appl. No.: 18/185,643

(22) Filed: Mar. 17, 2023

(65) Prior Publication Data

US 2023/0216773 A1 Jul. 6, 2023

Related U.S. Application Data

(63) Continuation of application No. PCT/CN2021/107098, filed on Jul. 19, 2021.

(30) Foreign Application Priority Data

Sep. 18, 2020 (CN) .......................... 202010989453.7

(51) Int. Cl.
*H04L 41/14* (2022.01)
*H04L 41/122* (2022.01)
(Continued)

(52) U.S. Cl.
CPC .......... *H04L 41/145* (2013.01); *H04L 41/122* (2022.05); *H04L 43/0811* (2013.01); *H04L 43/55* (2022.05); *H04L 43/20* (2022.05)

(58) Field of Classification Search
None
See application file for complete search history.

(56) References Cited

U.S. PATENT DOCUMENTS 11,737,164 B2 * 8/2023 Keyser-Allen .... H04W 36/0027
370/331
2004/0122645 A1 6/2004 Shevenell et al.
(Continued)

FOREIGN PATENT DOCUMENTS

CN 102006119 A 4/2011
CN 104954166 B 3/2019
(Continued)

OTHER PUBLICATIONS

Bahl, Victor et al, "Microsoft Azure and Microsoft Research take giant step towards eliminating network downtime", URL:https://www.microsoft.com/en-us/research/blog/eliminating-network-downtime/, Published Oct. 31, 2017, total 7 pages.
(Continued)

*Primary Examiner* — Angela Nguyen
(74) *Attorney, Agent, or Firm* — Slater Matsil, LLP

(57) ABSTRACT

For example, a network management device performs a method. The network management device collects network data of a current network. Then, the network management device generates a simulation network based on the network data of the current network. When there is a network change requirement, the simulation network can be changed based on a simulation change instruction, to obtain data of a changed simulation network. The network management device obtains a connectivity simulation result based on the data of the changed simulation network and a connectivity simulation input parameter. The network data of the current network is collected, so that restoration is performed and an independent simulation network is additionally generated. The simulation network is changed and the network data generated by the changed simulation network and the connectivity simulation input parameter are used to perform connectivity simulation.

20 Claims, 7 Drawing Sheets

(51) Int. Cl.
    *H04L 43/0811*     (2022.01)
    *H04L 43/55*     (2022.01)
    *H04L 43/20*     (2022.01)

(56) References Cited

U.S. PATENT DOCUMENTS

2019/0260654 A1*   8/2019   Toshniwal  ............ H04L 61/256
2022/0247662 A1*   8/2022   Chen  ....................... H04L 45/16

FOREIGN PATENT DOCUMENTS

| CN | 109768874 A | 5/2019 |
| CN | 111147287 A | 5/2020 |
| WO | 2018212914 A1 | 11/2018 |

OTHER PUBLICATIONS

Branscombe, Mary et al, "Microsoft Runs a Simulation of the Entire Azure Network to Prevent Outages", URL: https://www.datacenterknowledge.com/networks/microsoft-runs-simulation-entire-azure-network-prevent-outages, Nov. 8, 2017, total 11 pages.

* cited by examiner

NETWORK SIMULATION METHOD AND APPARATUS, DEVICE, AND COMPUTER-READABLE STORAGE MEDIUM

CROSS-REFERENCE TO RELATED APPLICATIONS

This application is a continuation of International Application No. PCT/CN2021/107098, filed on Jul. 19, 2021, which claims priority to Chinese Patent Application No. 202010989453.7, filed on Sep. 18, 2020. The disclosures of the aforementioned applications are hereby incorporated by reference in their entireties.

TECHNICAL FIELD

This application relates to the field of network operation and maintenance technologies, and in particular, to a network simulation method and apparatus, a device, and a computer-readable storage medium.

BACKGROUND

In a network operation and maintenance process, if a user needs to perform some change operations on a network, such as changing a device configuration, changing a network topology, and putting a device online or offline, before these network changes are implemented, impact caused by the network changes, especially whether mutual access of key services in the network will be affected, cannot be accurately evaluated.

Therefore, a network simulation method is needed to evaluate impact of a network change on a service in a current network before the change is implemented, to avoid a service fault after the network change.

SUMMARY

This application provides a network simulation method and apparatus, a device, and a computer-readable storage medium.

According to a first aspect, a network simulation method is provided. An example in which a network management device performs the method is used. The network management device collects network data of a current network. Then, the network management device generates a simulation network based on the network data of the current network. When there is a network change requirement, the simulation network can be changed based on a simulation change instruction, to obtain data of a changed simulation network. The network management device obtains a connectivity simulation result based on the data of the changed simulation network and a connectivity simulation input parameter.

The network data of the current network is collected, so that restoration is performed and an independent simulation network is additionally generated. The simulation network is changed and the data generated by the changed simulation network and the connectivity simulation input parameter are used to perform simulation. In this way, impact of the network change on a network service is evaluated in advance without changing running of the current network. In addition, before the network change operation is performed, whether forwarding of a specific packet in the network after the change meets an expectation can be discovered in advance, and forwarding of a normal service packet in the network is not affected.

In a possible implementation, the obtaining a connectivity simulation result based on the data of the changed simulation network and a connectivity simulation input parameter includes: importing the data of the changed simulation network and the connectivity simulation input parameter into a simulation engine, where the simulation engine is configured to obtain the connectivity simulation result based on the data of the changed simulation network and the connectivity simulation input parameter; and obtaining the connectivity simulation result from the simulation engine.

The data of the changed simulation network and the connectivity simulation input parameter are imported into the simulation engine, and the simulation engine obtains the connectivity simulation result, so that impact of the network change on network service reachability can be evaluated in advance without changing running of the current network.

In a possible implementation, the connectivity simulation input parameter includes a source IP address and a destination IP address, and the obtaining a connectivity simulation result based on the data of the changed simulation network and a connectivity simulation input parameter includes: generating a route forwarding entry based on the data of the changed simulation network; and determining a connectivity simulation result between the source address and the destination IP address based on the route forwarding entry and device configuration data in the data of the changed simulation network.

The network data of the current network is collected, so that restoration is performed and an independent simulation network is additionally generated. The simulation network is changed, and network management data generated by the simulation network, that is, the data of the changed simulation network, and the connectivity simulation input parameter are imported into the simulation engine to calculate reachability and a path between IPs in the network, so that impact of the network change on network service reachability can be evaluated in advance without changing running of the current network. In addition, according to the method provided in this embodiment of this application, before the network change operation is performed, whether forwarding of the specific packet in the network after the change meets the expectation can be discovered in advance, and forwarding of the normal service packet in the network is not affected.

According to a second aspect, a network simulation apparatus is provided. The apparatus includes: an obtaining module, configured to collect network data of a current network; a generation module, configured to generate a simulation network based on the network data of the current network; a change module, configured to change the simulation network based on a simulation change instruction, to obtain data of a changed simulation network; and a simulation module, configured to obtain a connectivity simulation result based on the data of the changed simulation network and a connectivity simulation input parameter.

In a possible implementation, the simulation module is configured to: import the data of the changed simulation network and the connectivity simulation input parameter into a simulation engine, where the simulation engine is configured to obtain the connectivity simulation result based on the data of the changed simulation network and the connectivity simulation input parameter; and obtain the connectivity simulation result from the simulation engine.

In a possible implementation, the connectivity simulation input parameter includes a source internet protocol IP address and a destination IP address, and the simulation module is configured to: generate a route forwarding entry based on the data of the changed simulation network; and determine a connectivity simulation result between the source IP address and the destination IP address based on the route forwarding entry and device configuration data in the data of the changed simulation network.

In a possible implementation of the first aspect or the second aspect, the connectivity simulation result includes a first connectivity simulation result and a mutual access path between the source IP address and the destination IP address, and the first connectivity simulation result indicates reachability between the source IP address and the destination IP address; or the connectivity simulation result includes a second connectivity simulation result and interruption location information, and the second connectivity simulation result indicates unreachability between the source IP address and the destination IP address.

In a possible implementation of the first aspect or the second aspect, the simulation change instruction includes at least one of an instruction used to add a network device, an instruction used to delete a network device, an instruction used to add a link, an instruction used to delete a link, an instruction used to modify an interface of a link, and an instruction used to change a device configuration.

In a possible implementation of the first aspect or the second aspect, the network data of the current network includes network topology data, device configuration data, and device type data of the current network; and the data of the changed simulation network includes network topology data, device configuration data, and device type data of the changed simulation network.

A network device is further provided. The network device includes a memory and a processor. The memory stores at least one instruction, and the at least one instruction is loaded and executed by the processor, so that the network device implements either of the foregoing network simulation methods.

A computer-readable storage medium is further provided. The storage medium stores at least one instruction, and the instruction is loaded and executed by a processor to implement either of the foregoing network simulation methods.

Another communication apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method according to any one of the first aspect and the possible implementations of the first aspect.

In an example embodiment, there are one or more processors, and there are one or more memories.

In an example embodiment, the memory may be integrated with the processor, or the memory is disposed independently of the processor.

In a specific implementation process, the memory may be a non-transitory (non-transitory) memory, such as a read-only memory (read-only memory, ROM). The memory and the processor may be integrated into a same chip, or may be separately disposed on different chips. A type of the memory and a manner in which the memory and the processor are disposed are not limited in this embodiment of this application.

A computer program (product) is provided. The computer program (product) includes computer program code. When the computer program code is run on a computer, the computer is enabled to perform the methods according to the foregoing aspects.

A chip is provided. The chip includes a processor, configured to: invoke, from a memory, instructions stored in the memory and run the instructions, so that a communication device on which the chip is installed performs the methods according to the foregoing aspects.

Another chip is provided. The chip includes an input interface, an output interface, a processor, and a memory. The input interface, the output interface, the processor, and the memory are connected to each other through an internal connection channel. The processor is configured to execute code in the memory. When the code is executed, the processor is configured to perform the methods according to the foregoing aspects.

DETAILED DESCRIPTION OF ILLUSTRATIVE EMBODIMENTS

Terms used in an implementation part of this application are merely used to explain embodiments of this application, and are not intended to limit this application.

In a network operation and maintenance process, some network change scenarios are often related. For example, a user needs to perform change operations on a network, including a device configuration change, a network topology change, and even putting a device online or offline. If some change operations need to be performed on the network, before these network changes are implemented, impact caused by the network changes, especially whether to affect mutual access of key services in the network, cannot be accurately evaluated. In this case, after the network change is implemented, some services in the network are affected. For example, services that can mutually access before the network change cannot mutually access after the network change; forwarding paths before the network change are optimal, and the forwarding paths after the network change are detoured.

In an actual operation and maintenance process, for a network change scenario, whether a service fault is reported usually only after the change is implemented is used to evaluate whether the change meets an expectation. However, if the service fault is reported, a network administrator rectifies the fault, affecting service continuity running. If the fault cannot be rectified in a short period, there is a need to roll back the change, check the fault, and perform a change operation again by selecting an occasion. In this case, network operation and maintenance personnel are in an extremely passive situation, and operation and maintenance efficiency is also low.

Figure 1:
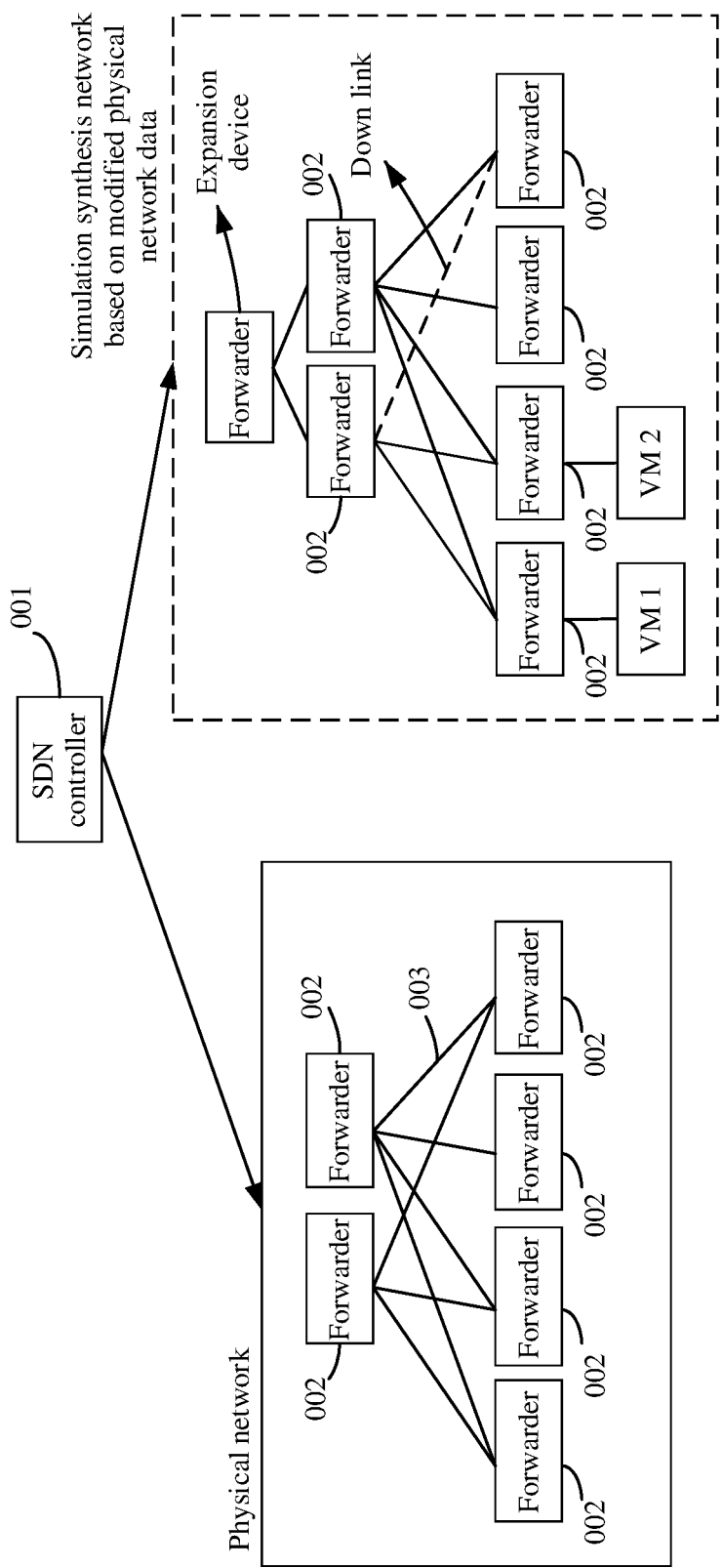
FIG. 1 is a schematic diagram of an application scenario according to an embodiment of this application.

Therefore, an embodiment of this application provides a network simulation method. Impact of a change on a service in a current network can be evaluated before the network change is implemented, so that a service fault is not reported after the network change. For example, the method is applied to a scenario shown in FIG. 1. A network simulation system shown in FIG. 1 includes an SDN controller 001 and a forwarder 002. The SDN controller 001 and the forwarder 002 are connected through an interconnection link 003. A physical network shown on the left side of FIG. 1 is a current network, and the current network includes six forwarders 002 and seven interconnection links 003. After a simulation network is generated based on network data of the physical network, a simulation change instruction is executed to obtain a simulation synthesis network shown on the right side of FIG. 1, that is, a changed simulation network. It is easily learned from the simulation network shown on the right side of FIG. 1 that a new forwarder 002 is added, a VM 1 and a VM 2 are configured for existing forwarders 002, and an existing link is put offline.

Figure 2:
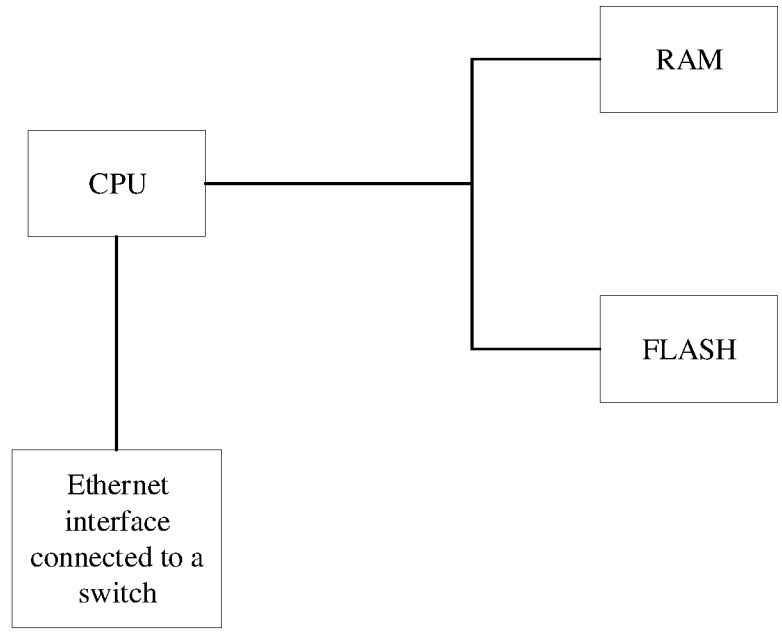
FIG. 2 is a schematic diagram of another application scenario according to an embodiment of this application.

A structure of the SDN controller 001 is that shown in FIG. 2. The SDN controller 001 includes a central processing unit (CPU), a random access memory (RAM), a FLASH memory, and an Ethernet interface. The CPU is a control unit of the SDN controller 001, and a running program and a statically configured parameter are stored in the FLASH. Code and data executed during program running are stored in the RAM connected to the CPU. The Ethernet interface completes Ethernet interconnection of fiber ports or electrical ports between devices and is responsible for receiving and sending a packet.

Figure 3:
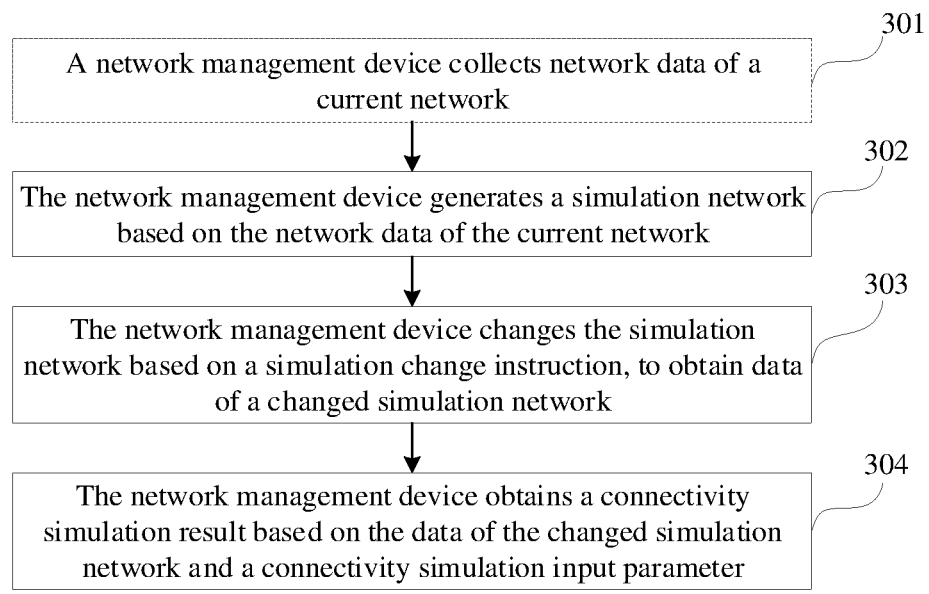
FIG. 3 is a schematic diagram of a structure of a network device according to an embodiment of this application.

The following describes the method provided in embodiments of this application by using an example in which the SDN controller 001 is used as a network management device for performing the method provided in embodiments of this application. Refer to FIG. 3. A network simulation method provided in an embodiment of this application includes the following several processes.

301: A network management device collects network data of a current network.

For example, the network data of the current network includes network topology data, device configuration data, and device type data of the current network. Content of the network topology data, the device configuration data, and the device type data of the current network is not limited in this embodiment of this application. For example, the network topology data of the current network includes but is not limited to interface status change data of the current network, a network topology identifier, a quantity of nodes in a network topology, and a connection relationship. The device configuration data of the current network includes but is not limited to interface configuration data and network and protocol configurations of a device of the current network. The device type data of the current network includes but is not limited to a device model and a device type of the current network.

A manner in which the network device collects the network data of the current network is also not limited in this embodiment of this application. For example, each device in the current network actively reports device configuration data and device type data, and the network device collects and obtains the device configuration data and the device type data of the current network, and obtains network topology data based on the device configuration data and the device type data. Alternatively, the network device delivers a data collection instruction to each device in the current network, so that each device in the current network reports device configuration data and device type data based on the data collection instruction.

Regardless of a manner used to collect the network data of the current network, because the network data of the current network is running-state data, that is, data being used in the current network, if a network change, for example, a device configuration change or a network structure change, needs to be performed, a service of the current network is affected. Therefore, according to the method provided in this embodiment of this application, impact of the change on the service in the current network is first evaluated before the network change is implemented. In addition, in order not to affect the service in the current network, in the method provided in this embodiment of this application, the current network is not directly changed, but the network data of the current network is copied to obtain a copy of the network data, so that network simulation is performed based on the copy of the network data.

In this embodiment of this application, the network data of the current network and the copy of the network data are separately stored. For example, the network data of the current network is stored in a running-state database, and the copy of the network data is stored in a simulating-state database.

302: The network management device generates a simulation network based on the network data of the current network.

Because the copy of the network data is obtained by copying the network data of the current network, the copy of the network data is consistent with the network data of the current network. The simulation network is generated based on the copy of the network data, so that a network environment of the simulation network is the same as that of the current network, to implement network simulation in the same network environment.

This embodiment of this application imposes no limitation on a manner of generating the simulation network based on the copy of the network data. Because the network data of the current network includes the network topology data, the device configuration data, and the device type data of the current network, the copy of the network data includes a copy of the network topology data, a copy of the device configuration data, and a copy of the device type data. The network device generates the simulation network based on the copy of network topology data, the copy of device configuration data, and the copy of device type data.

303: The network management device changes the simulation network based on a simulation change instruction, to obtain data of a changed simulation network.

After the simulation network is generated, a network change is implemented in the simulation network based on a network change requirement. For example, a network administrator inputs the simulation change instruction, and the network device changes the simulation network based on the simulation change instruction, to obtain the data of the changed simulation network. For example, the simulation change instruction includes but is not limited to at least one of an instruction used to add a network device, an instruction used to delete a network device, an instruction used to add a link, an instruction used to delete a link, an instruction used to modify an interface of a link, and an instruction used to change a device configuration.

The scenario shown in FIG. 2 is used as an example. The simulation change instruction includes the instruction used to add the network device and the instruction used to delete the link. A new network device is added to the simulation network by using the instruction used to add the network device, and an existing link is deleted from the simulation network by using the instruction used to delete the link, to obtain the changed simulation network. Then, data collection may be performed on the changed simulation network to obtain the data of the changed simulation network. For example, the data of the changed simulation network includes changed network topology data, changed device configuration data, and changed device type data.

304: The network management device obtains a connectivity simulation result based on the data of the changed simulation network and a connectivity simulation input parameter.

After the network change is implemented on the simulation network, to first evaluate impact of the change on a service in the current network before the network change is implemented, in the method provided in this embodiment of this application, the connectivity simulation input parameter may be received to perform network simulation based on the connectivity simulation input parameter and the data of the changed simulation network, to obtain the connectivity simulation result, and to analyze impact of the network change.

The connectivity simulation input parameter is not limited in this embodiment of this application, and may be determined based on a simulation requirement. For example, if network connectivity simulation needs to be performed, the connectivity simulation input parameter includes but is not limited to a source IP address and a destination IP address of simulation connectivity. In addition, the connectivity simulation input parameter further includes but is not limited to parameters such as a protocol and a port number.

In an example embodiment, a manner in which the network device obtains the connectivity simulation result based on the data of the changed simulation network and the connectivity simulation input parameter includes but is not limited to the following two manners.

Manner 1: The obtaining the connectivity simulation result based on the data of the changed simulation network and the connectivity simulation input parameter includes: importing the data of the changed simulation network and the connectivity simulation input parameter into a simulation engine, where the simulation engine is configured to obtain the connectivity simulation result based on the data of the changed simulation network and the connectivity simulation input parameter; and obtaining the connectivity simulation result from the simulation engine.

In the manner 1, the network device does not directly obtain the connectivity simulation result based on the data of the changed simulation network and the connectivity simulation input parameter, but sends the data of the changed simulation network and the connectivity simulation input parameter to the simulation engine. The simulation engine is a component that can perform simulation based on network data and has a capability of executing a simulation algorithm. Therefore, after receiving the data of the changed simulation network and the connectivity simulation input parameter, the simulation engine can obtain the connectivity simulation result by using the simulation algorithm. For example, the simulation engine is integrated into the network device in a manner of a microservice component, and communicates with the network device through an internal interface. In this case, the network device sends the data of the changed simulation network and the connectivity simulation input parameter to the simulation engine through the internal interface. Alternatively, the simulation engine is integrated into another device other than the network device, and the network device can communicate with and connect to the another device integrated with the simulation engine, to access the simulation engine, and send the data of the changed simulation network and the connectivity simulation input parameter to the simulation engine.

Manner 2: The connectivity simulation input parameter includes a source IP address and a destination IP address, and the obtaining the connectivity simulation result based on the data of the changed simulation network and the connectivity simulation input parameter includes: generating a route forwarding entry based on the data of the changed simulation network; and determining a connectivity simulation result between the source IP address and the destination IP address based on the route forwarding entry and device configuration data in the data of the changed simulation network.

In the manner 2, the network device directly obtains the connectivity simulation result based on the data of the changed simulation network and the connectivity simulation input parameter. For example, the network device obtains the connectivity simulation result based on the data of the changed simulation network and the connectivity simulation input parameter by using the simulation algorithm. For example, the connectivity simulation input parameter includes the source IP address and the destination IP address. The network device generates the route forwarding entry based on the data of the changed simulation network. In addition, because the device configuration data includes but is not limited to the interface configuration data and the network and protocol configurations of the device, and the like, when connectivity between the source IP address and the destination IP address needs to be simulated and calculated, the simulation algorithm is used to obtain each device along a path between the source IP address and the destination IP address based on the device configuration data in the data of the changed simulation network, inbound and outbound interfaces are calculated based on a forwarding entry matching a packet in each device, whether the packet matches a configured access control policy is also calculated, whether the packet is intercepted is determined, and the like. A determining result is used to obtain the connectivity simulation result between the source IP address and the destination IP address.

For example, if the path between the source IP address and the destination IP address is reachable, the connectivity simulation result includes a first connectivity simulation result and a mutual access path between the source IP address and the destination IP address, and the first connectivity simulation result indicates reachability between the source IP address and the destination IP address. If the path between the source IP address and the destination IP address is unreachable, the connectivity simulation result includes a second connectivity simulation result and interruption location information, and the second connectivity simulation result indicates unreachability between the source IP address and the destination IP address. The interrupt location information indicates an interrupt location. For example, the interrupt location information is an address of a device, indicating that interruption occurs at the device. In addition, when the path between the source IP address and the destination IP address is unreachable, the connectivity simulation result further includes an interruption reason, for example, because a route is unreachable or a blocking policy is used.

It should be noted that if the path between the source IP address and the destination IP address is reachable, a controller may display the mutual access path. If there are a plurality of mutual access paths between the source IP address and the destination IP address, the controller may further display all of the plurality of mutual access paths. This embodiment of this application imposes no limitation on a manner of displaying the mutual access path.

Figure 4:
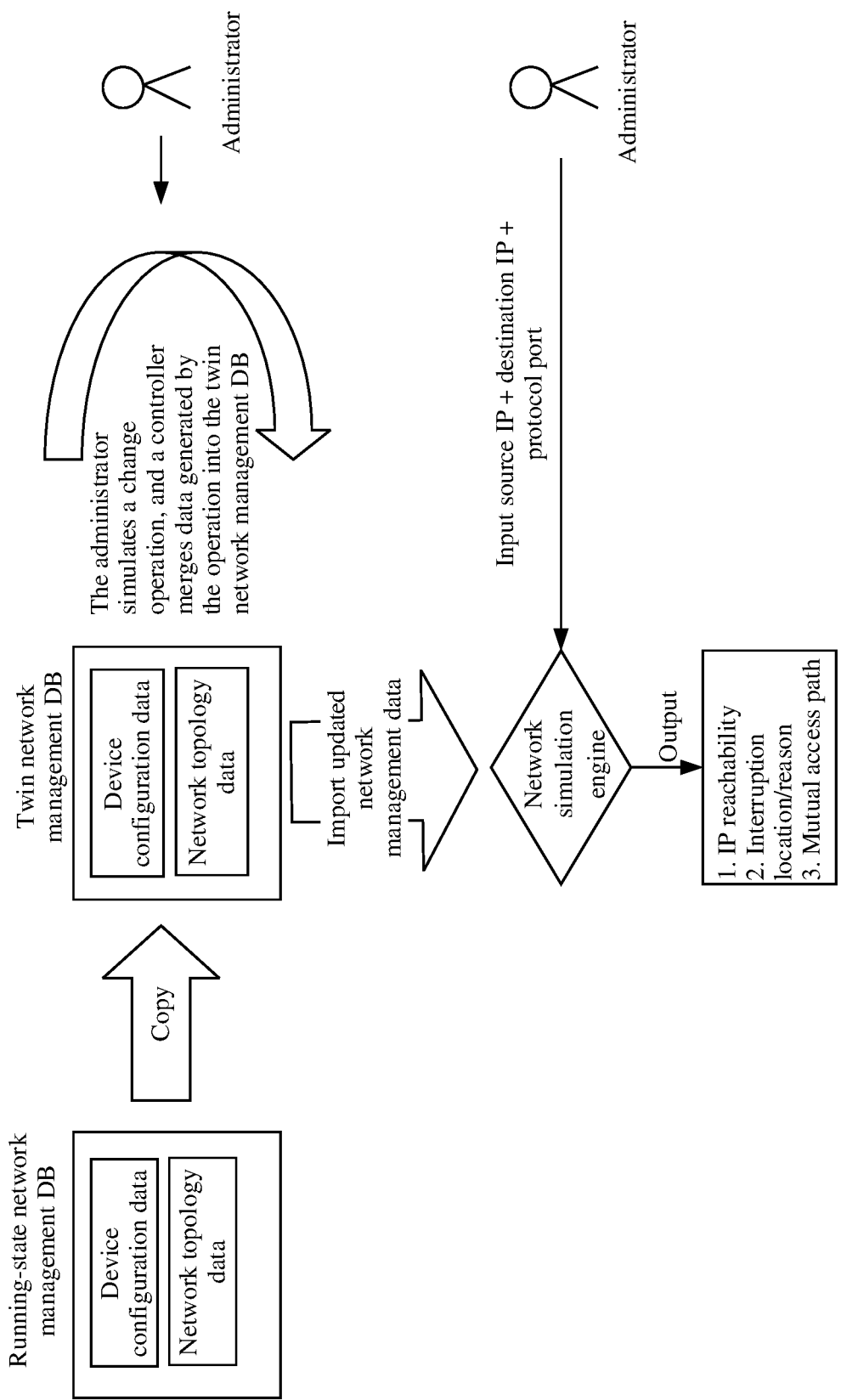
FIG. 4 is a flowchart of a network simulation method according to an embodiment of this application.

For example, the network simulation process shown in FIG. 3 may be that shown in FIG. 4. Network data of a current network is collected, and the network data of the current network is stored in a running-state network management DB. For example, the network data of the current network includes device configuration data and network topology data. Then, the network data of the current network is copied to obtain a copy of the network data, and the copy of the network data may also be referred to as twin data of the network data. To perform network simulation without affecting the current network, the copy of the network data is stored in a DB different from the running-state network management DB. For example, the copy of the network data is stored in a twin network management DB. When an administrator simulates a change operation, a controller merges data generated by the operation into the twin network management DB. Updated network management data, that is, updated simulation network data, is imported into a network simulation engine. The controller receives a source IP address, a destination IP address, and a protocol port that are input by the administrator, to obtain a connectivity simulation input parameter. The connectivity simulation input parameter is input to the network simulation engine, and content such as an IP reachability result and a mutual access path, or an IP unreachability result and an interruption location/cause is output based on the network simulation engine.

In conclusion, according to the method provided in this embodiment of this application, restoration is performed and an independent simulation network is additionally generated. The simulation network is changed, and network simulation is directly performed based on the data of the changed simulation network and the connectivity simulation input parameter to obtain the connectivity simulation result; or network management data generated by the simulation network, that is, the data of the changed simulation network, and the connectivity simulation input parameter are imported into the simulation engine, and the simulation engine obtains the connectivity simulation result, so that impact of the network change on network service reachability can be evaluated in advance without changing running of the current network. In addition, before the network change operation is performed, whether forwarding of a specific packet in the network after the change meets an expectation can be discovered in advance, and forwarding of a normal service packet in the network is not affected.

Figure 5:
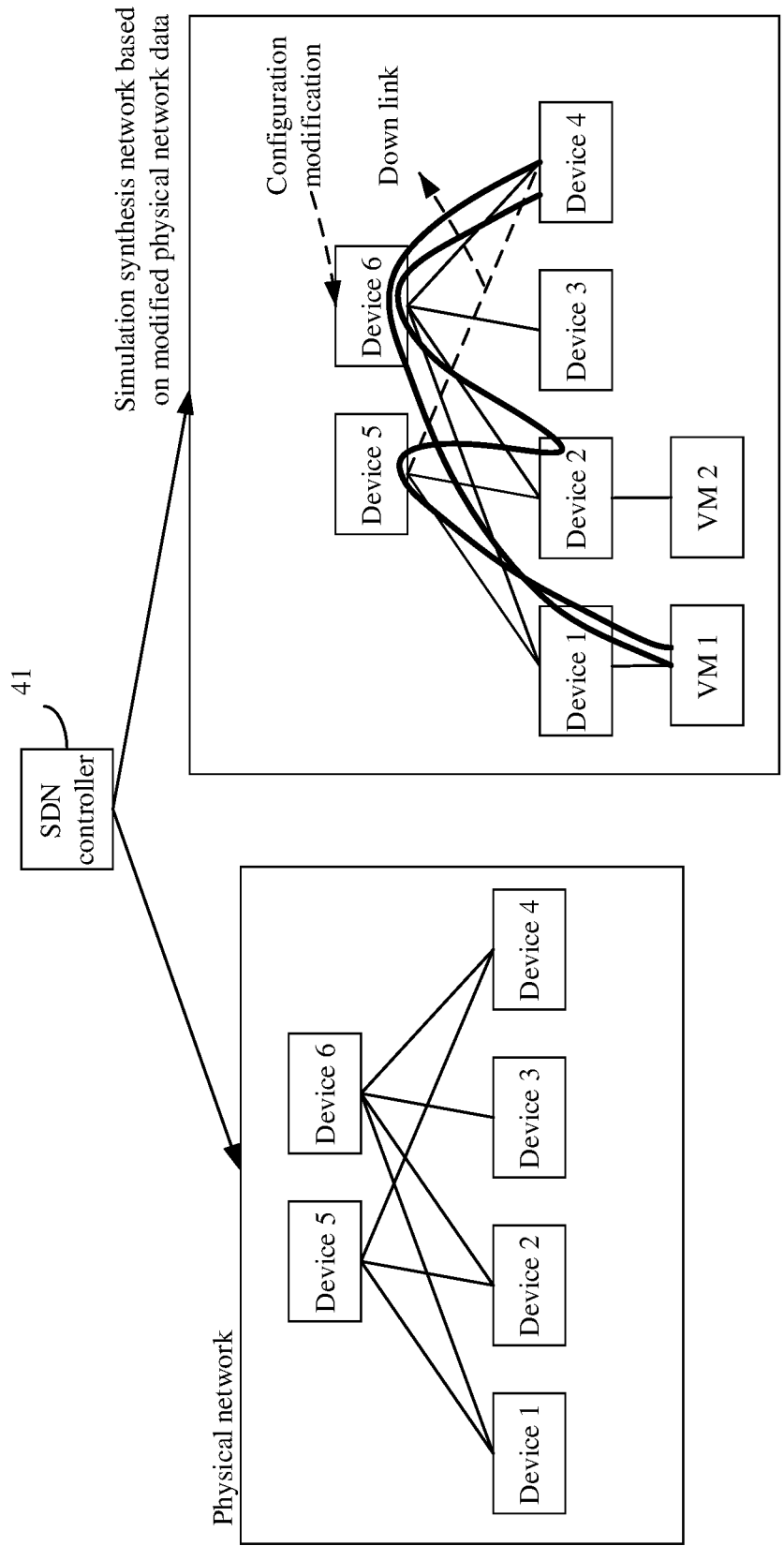
FIG. 5 is a schematic interaction flowchart of a network simulation method according to an embodiment of this application.

Next, an example in which the network device is an SDN controller and a CPV simulation engine is integrated into the SDN controller is used to describe, with reference to a scenario shown in FIG. 5, the method provided in this embodiment of this application. As shown in FIG. 5, a network simulation system includes an SDN controller 41 and six forwarders, where the six forwarders are a device 1, a device 2, a device 3, a device 4, a device 5, and a device 6 respectively. A physical network shown on the left side of FIG. 5 is a current network. In the current network, the device 5 is separately connected to the device 1, the device 2, and the device 4 through an interconnection link, and the device 6 is separately connected to the device 1, the device 2, the device 3, and the device 4 through an interconnection link.

After a simulation network is generated based on a copy of network data of the current network, a user needs to change the physical network, that is, the current network, including temporarily putting an interconnection link between the device 5 and the device 4 offline, and modifying a part of configurations of the device 6. Therefore, a simulation change instruction is executed to obtain a simulation synthesis network shown on the right side of FIG. 5, that is, a changed simulation network. As shown in the right side of FIG. 5, in the changed simulation network, the configuration of the device 6 is modified, and the interconnection link between the device 5 and the device 4 is deleted. The deleted link is a down link on the right side of FIG. 5. In addition, a VM 1 is configured on the device 1, and a VM 2 is configured on the device 4.

Figure 6:
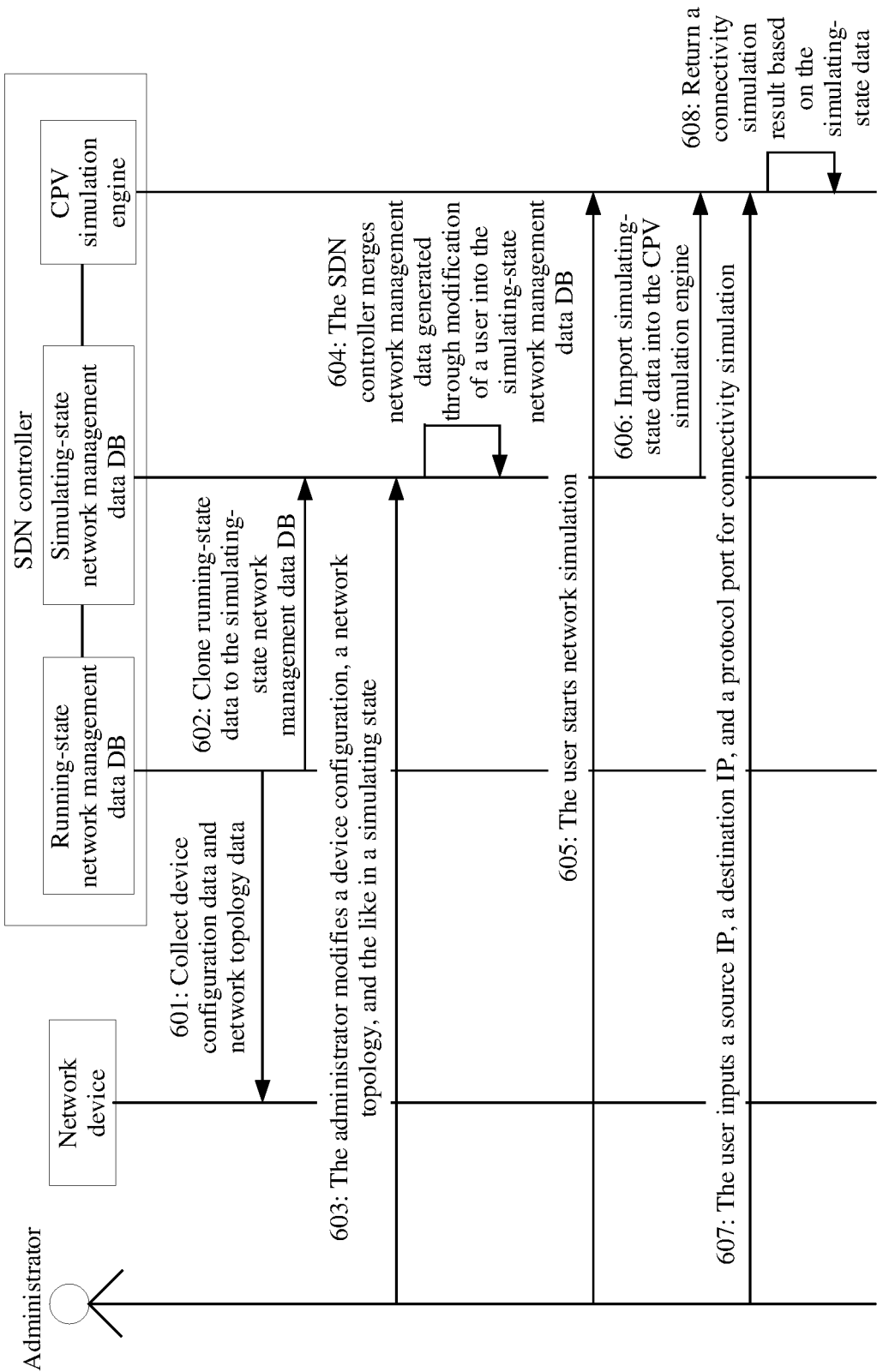
FIG. 6 is a schematic diagram of a network simulation process according to an embodiment of this application.

Before the change is formally implemented, to evaluate whether the change affects mutual access between the VM 1 and the VM 2, a simulation change operation is performed in advance on the SDN controller by using the method provided in this embodiment of this application. In an example of simulating connectivity between the VM 1 and the VM 2, the network simulation method provided in this embodiment of this application is that shown in FIG. 6, and includes but is not limited to the following several processes.

601: An SDN controller collects network data of a current network, and stores the network data of the current network into a running-state network management data database (DB), where the network data of the current network includes device configuration data and network topology data.

602: The SDN controller copies (clones) running-state data to obtain a copy of the network data, and stores the copy of the network data into a simulating-state network management data DB.

The SDN controller may generate a simulation network based on the copy of the network data.

603: The SDN controller obtains a network change instruction based on a device configuration, a network topology, and the like in a simulating state that are modified by an administrator.

604: The SDN controller merges network management data generated through modification of a user into the simulating-state network management data DB.

It should be noted that the network management data generated through modification of the user relates to update of simulating-state data, and the SDN controller can obtain updated simulation network data. The updated simulation network data does not affect running-state data, that is, the updated simulation network data does not affect the network data of the current network, so that normal running of a service in the current network can be ensured.

605: The SDN controller receives a network simulation start instruction.

606: The SDN controller imports, based on the network simulation start instruction, the simulating-state data, that is, the updated simulation network data, into a CPV simulation engine for simulation.

For example, the CPV simulation engine communicates with the SDN controller through an internal interface, and the SDN controller sends the updated simulation network data to the CPV simulation engine through the internal interface.

607: The CPV simulation engine receives a connectivity simulation input parameter. For example, the connectivity simulation input parameter is a source IP address, a destination IP address, and a protocol port that are input by the user.

In the scenario shown in FIG. 5, the source IP address input by the user is an address of a VM 1, and the destination IP address is an address of a VM 2. The SDN controller may first receive the source IP address, the destination IP address, and the protocol port that are input by the user, and then transmit the source IP address, the destination IP address, and the protocol port to the CPV simulation engine through the internal interface.

608: The CPV simulation engine performs connectivity simulation based on the simulating-state data, that is, the data of the changed simulated network, and the connectivity simulation input parameter, to obtain a connectivity simulation result.

For example, the CPV simulation engine generates a route forwarding entry based on the data of the changed simulation network, and then calculates, by using a simulation algorithm, whether a path between the VM 1 and the VM 2 is reachable. For example, when the CPV simulation engine simulates and calculates connectivity between the source IP address of the VM 1 and the destination IP address of the VM 2, because device configuration data includes but is not limited to interface configuration data, network and protocol configurations of a device, and the like, the simulation algorithm is used to obtain each device along a path between the source IP address and the destination IP address based on the device configuration data in the data of the changed simulation network, inbound and outbound interfaces are calculated based on a forwarding entry matching a packet in each device, whether the packet matches a configured access control policy is also calculated, whether the packet is intercepted is determined, and the like. A determining result is used to obtain a connectivity simulation result between the source IP address and the destination IP address.

For example, if the path between the VM 1 and the VM 2 is reachable, the connectivity simulation result includes a first connectivity simulation result and a mutual access path, and the first connectivity simulation result indicates that the path between the VM 1 and the VM 2 is reachable, that is, indicates reachability between the source IP address and the destination IP address. For example, in the scenario shown in FIG. 5, the path between the VM 1 and the VM 2 is reachable, and two reachable paths are included. One reachable path is VM 1->device 1->device 5->device 2->device 6->device 4->VM 2, and the other reachable path is VM 1->device 1->device 5->device 6->device 4->VM 2.

If the path between the VM 1 and the VM 2 is unreachable, the connectivity simulation result includes a second connectivity simulation result and interruption location information, and the second connectivity simulation result indicates that the path between the VM 1 and the VM 2 is unreachable, that is, indicates unreachability between the source IP address and the destination IP address. The interrupt location information indicates an interrupt location. For example, the interrupt location information is an address of a device, indicating that interruption occurs at the device. In addition, when the path between the source IP address and the destination IP address is unreachable, the connectivity simulation result further includes an interruption reason, for example, because a route is unreachable or a blocking policy is used.

The foregoing describes the network simulation method in embodiments of this application. Corresponding to the foregoing method, an embodiment of this application further provides a network simulation apparatus.

Figure 7:
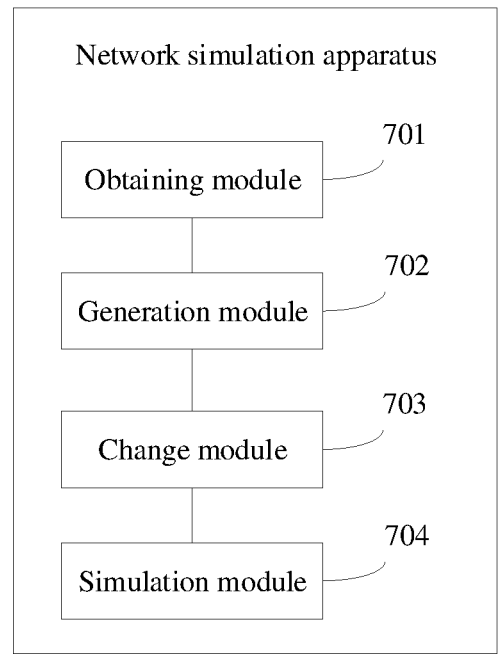
FIG. 7 is a schematic diagram of a structure of a network simulation apparatus according to an embodiment of this application.

An embodiment of this application provides a network simulation apparatus. The apparatus is configured to perform the network simulation method in FIG. 3 or FIG. 5 by using each module shown in FIG. 7. Refer to FIG. 7. The network simulation apparatus provided in this embodiment of this application includes the following modules.

An obtaining module 701 is configured to collect network data of a current network. For a function performed by the obtaining module 701, refer to 301 shown in FIG. 3. Details are not described herein again.

A generation module 702 is configured to generate a simulation network based on the network data of the current network. For a function performed by the generation module 702, refer to 302 shown in FIG. 3. Details are not described herein again.

A change module 703 is configured to change the simulation network based on a simulation change instruction, to obtain data of a changed simulation network. For a function performed by the change module 703, refer to 303 shown in FIG. 3. Details are not described herein again.

A simulation module 704 is configured to obtain a connectivity simulation result based on the data of the changed simulation network and a connectivity simulation input parameter. For a function performed by the simulation module 704, refer to 304 shown in FIG. 3. Details are not described herein again.

In a possible implementation, the simulation module 704 is configured to: import the data of the changed simulation network and the connectivity simulation input parameter into a simulation engine, where the simulation engine is configured to obtain the connectivity simulation result based on the data of the changed simulation network and the connectivity simulation input parameter; and obtain the connectivity simulation result from the simulation engine.

In a possible implementation, the connectivity simulation input parameter includes a source internet protocol IP address and a destination IP address, and the simulation module is configured to: generate a route forwarding entry based on the data of the changed simulation network; and determine a connectivity simulation result between the source IP address and the destination IP address based on the route forwarding entry and device configuration data in the data of the changed simulation network.

In a possible implementation, the connectivity simulation result includes a first connectivity simulation result and a mutual access path between the source IP address and the destination IP address, and the first connectivity simulation result indicates reachability between the source IP address and the destination IP address.

Alternatively, the connectivity simulation result includes a second connectivity simulation result and interruption location information, and the second connectivity simulation result indicates unreachability between the source IP address and the destination IP address.

In a possible implementation, the simulation change instruction includes at least one of an instruction used to add a network device, an instruction used to delete a network device, an instruction used to add a link, an instruction used to delete a link, an instruction used to modify an interface of a link, and an instruction used to change a device configuration.

In a possible implementation, the network data of the current network includes network topology data, device configuration data, and device type data.

According to the apparatus provided in this embodiment of this application, the network data of the current network is collected, so that restoration is performed and an independent simulation network is additionally generated. The simulation network is changed, and network management data generated by the simulation network, that is, the data of the changed simulation network, and the connectivity simulation input parameter are imported into the simulation engine, and the simulation engine obtains the connectivity simulation result. Alternatively, network simulation is directly performed based on the data of the changed simulation network and the connectivity simulation input parameter, to obtain the connectivity simulation result, so that impact of the network change on network service reachability can be evaluated in advance without changing running of the current network. In addition, before the network change operation is performed, whether forwarding of a specific packet in the network after the change meets an expectation can be discovered in advance, and forwarding of a normal service packet in the network is not affected.

It should be understood that, when the apparatus provided in FIG. 7 implements functions of the apparatus, division into the foregoing functional modules is merely used as an example for description. During actual application, the foregoing functions may be allocated to different functional modules for implementation based on a requirement. In other words, a device is divided into different functional modules in terms of an inner structure, to implement all or some of the functions described above. In addition, the apparatuses provided in the foregoing embodiments and the method embodiments pertain to a same concept. For a specific implementation process of the apparatuses, refer to the method embodiments. Details are not described herein again.

Figure 8:
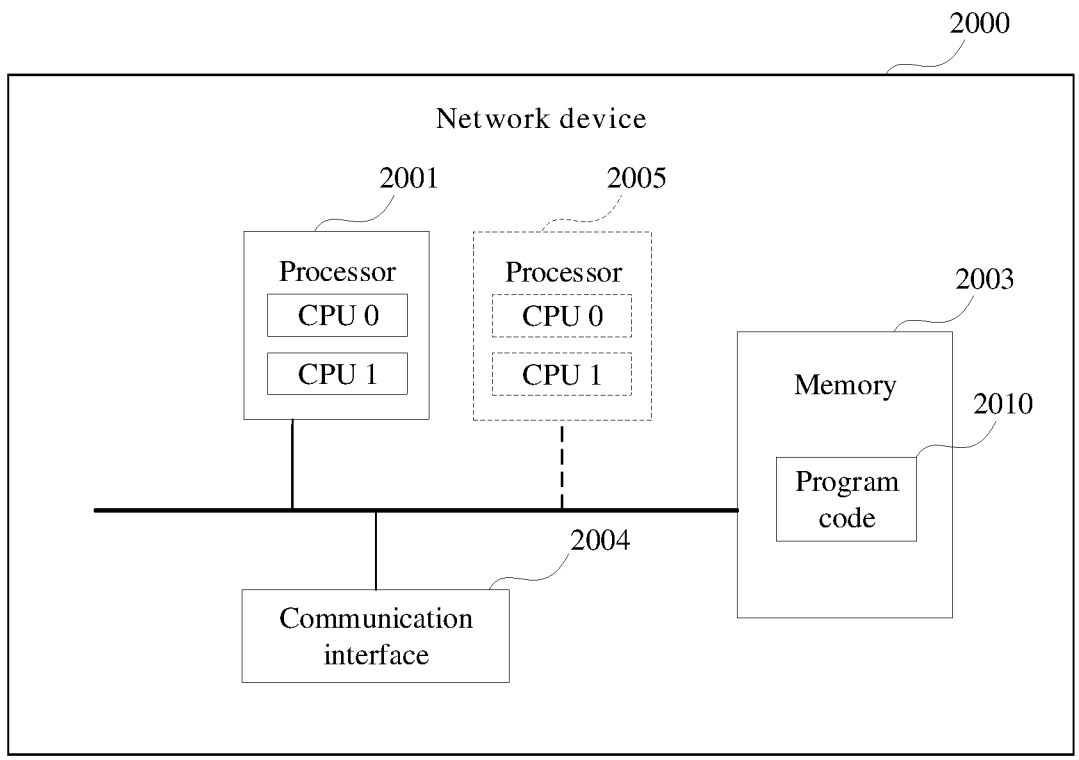
FIG. 8 is a schematic diagram of a structure of a network device according to an embodiment of this application.

FIG. 8 is a schematic diagram of a structure of a network device 2000 according to an example embodiment of this application. The network device 2000 shown in FIG. 8 is configured to perform operations related to the network simulation methods shown in FIG. 3 and FIG. 5. The network device 2000 is, for example, a switch, a router, or a controller. The network device 2000 may be implemented by using a general bus architecture.

As shown in FIG. 8, the network device 2000 includes at least one processor 2001, a memory 2003, and at least one communication interface 2004.

The processor 2001 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 2001 includes an application-specific integrated circuit (ASIC), a programmable logic device (PLD) or another programmable logic device, a transistor logic device, a hardware component, or any combination thereof. The PLD is, for example, a complex programmable logic device (CPLD), a field-programmable gate array (FPGA), generic array logic (GAL), or any combination thereof. The processor may implement or execute various logical blocks, modules, and circuits described with reference to content disclosed in this embodiment of the present invention. Alternatively, the processor may be a combination of processors implementing a computing function, for example, a combination of one or more microprocessors, or a combination of a DSP and a microprocessor.

Optionally, the network device 2000 further includes a bus. The bus is configured to transmit information between the components of the network device 2000. The bus may be a peripheral component interconnect (PCI for short) bus, an extended industry standard architecture (EISA for short) bus, or the like. Buses may be classified into an address bus, a data bus, a control bus, and the like. For ease of representation, only one thick line is for representing the bus in FIG. 8, but this does not mean that there is only one bus or only one type of bus.

The memory 2003 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. For example, the memory 2003 exists independently, and is connected to the processor 2001 through the bus. Alternatively, the memory 2003 may be integrated with the processor 2001.

The communication interface 2004 is any apparatus such as a transceiver, to communicate with another device or a communication network. The communication network may be the Ethernet, a radio access network (RAN), a wireless local area network (WLAN), or the like. The communication interface 2004 may include a wired communication interface, and may further include a wireless communication interface. Specifically, the communication interface 2004 may be an Ethernet interface, a fast Ethernet (FE) interface, a gigabit Ethernet (GE) interface, an asynchronous transfer mode (ATM) interface, a wireless local area network (WLAN) interface, a cellular network communication interface, or a combination thereof. The Ethernet interface may be an optical interface, an electrical interface, or a combination thereof. In this embodiment of this application, the communication interface 2004 may be used by the network device 2000 to communicate with another device.

During specific implementation, in an embodiment, the processor 2001 may include one or more CPUs, for example, a CPU 0 and a CPU 1 shown in FIG. 8. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the network device 2000 may include a plurality of processors, for example, the processor 2001 and a processor 2005 shown in FIG. 8. Each of the processors may be a single-core (single-CPU) processor, or may be a multi-core (multi-CPU) processor. The processor herein may be one or more devices, circuits, and/or processing cores configured to process data (for example, computer program instructions).

During specific implementation, in an embodiment, the network device 2000 may further include an output device and an input device. The output device communicates with the processor 2001, and may display information in a plurality of manners. For example, the output device may be a liquid crystal display (LCD), a light emitting diode (LED) display device, a cathode ray tube (CRT) display device, or a projector. The input device communicates with the processor 2001, and may receive an input of a user in a plurality of manners. For example, the input device may be a mouse, a keyboard, a touchscreen device, or a sensing device.

In some embodiments, the memory 2003 is configured to store program code 2010 for executing the solutions of this application, and the processor 2001 may execute the program code 2010 stored in the memory 2003. That is, the network device 2000 may implement, by using the processor 2001 and the program code 2010 in the memory 2003, the network simulation methods provided in the method embodiments. The program code 2010 may include one or more software modules. Optionally, the processor 2001 may also store program code or instructions for executing the solutions of this application.

In a specific embodiment, the network device 2000 in this embodiment of this application may correspond to the network device in the foregoing method embodiments. The processor 2001 in the network device 2000 reads instructions in the memory 2003, so that the network device 2000 shown in FIG. 8 can perform all or some of operations performed by the network device in the method embodiments.

The network device 2000 may further correspond to the apparatus shown in FIG. 7. Each functional module in the apparatus shown in FIG. 7 is implemented by using software of the network device 2000. In other words, the functional modules included in the apparatus shown in FIG. 7 are generated after the processor 2001 of the network device 2000 reads the program code 2010 stored in the memory 2003.

The steps of the network simulation method shown in FIG. 3 are completed by using an integrated logic circuit of hardware or instructions in a form of software in the processor of the network device 2000. The steps of the method disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with the hardware in the processor. To avoid repetition, details are not described herein again.

Figure 9:
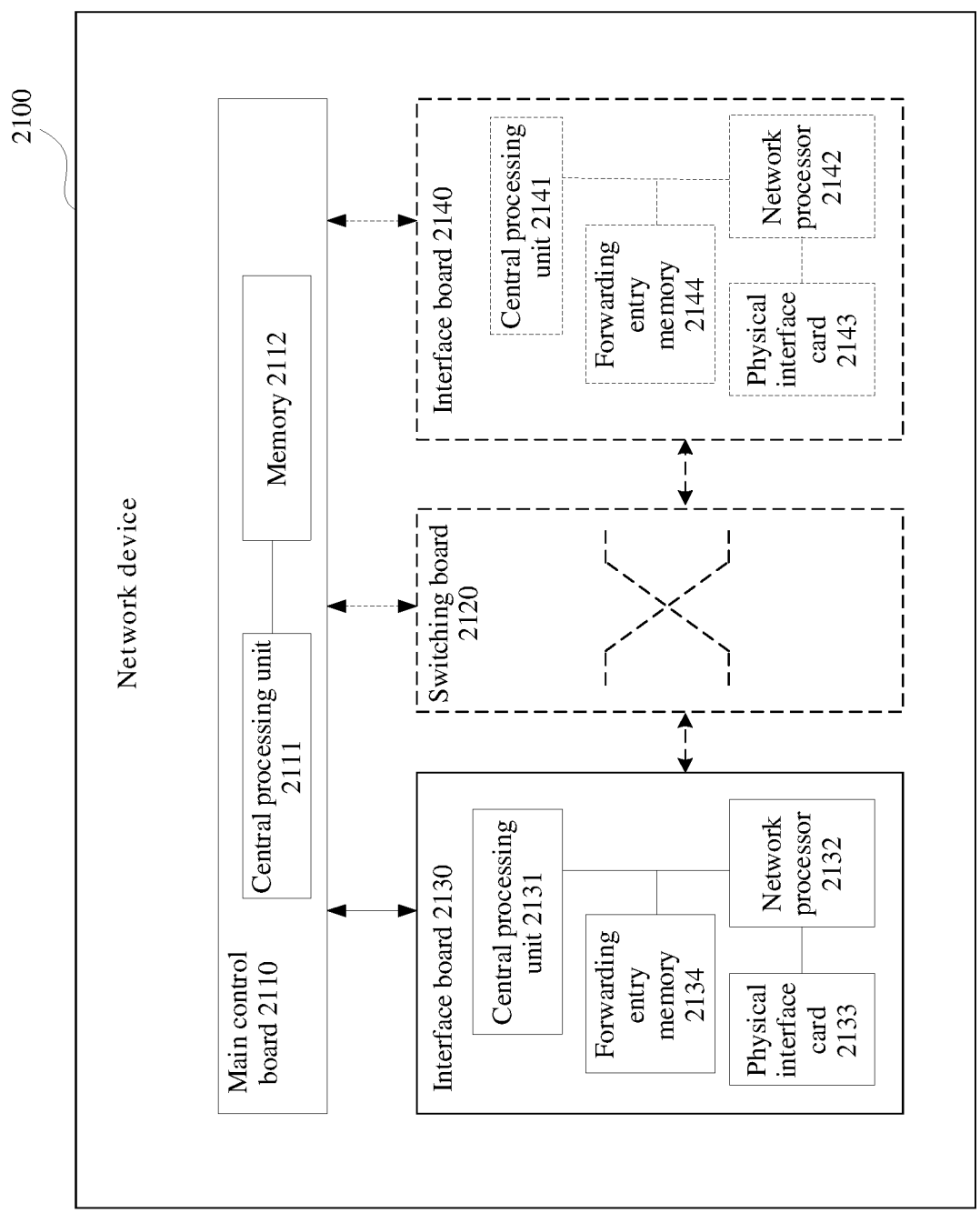
FIG. 9 is a schematic diagram of a structure of a network device according to an embodiment of this application.

FIG. 9 is a schematic diagram of a structure of a network device 2100 according to another example embodiment of this application. The network device 2100 shown in FIG. 9 is configured to perform all or some operations related to the network simulation methods shown in FIG. 3 and FIG. 5. The network device 2100 is, for example, a switch or a router. The network device 2100 may be implemented by using a general bus architecture.

As shown in FIG. 9, the network device 2100 includes a main control board 2110 and an interface board 2130.

The main control board is also referred to as a main processing unit (MPU) or a route processor card. The main control board 2110 is configured to control and manage components in the network device 2100, including route computation, device management, device maintenance, and protocol-based processing functions. The main control board 2110 includes a central processing unit 2111 and a memory 2112.

The interface board 2130 is also referred to as a line processing unit (LPU), a line card, or a service board. The interface board 2130 is configured to: provide various service interfaces, and forward a data packet. The service interface includes but is not limited to an Ethernet interface, a POS (Packet over SONET/SDH) interface, and the like. The Ethernet interface is, for example, a flexible Ethernet service interface (Flexible Ethernet Clients, FlexE Clients). The interface board 2130 includes a central processing unit 2131, a network processor 2132, a forwarding entry memory 2134, and a physical interface card (PIC) 2133.

The central processing unit 2131 on the interface board 2130 is configured to: control and manage the interface board 2130 and communicate with the central processing unit 2111 on the main control board 2110.

The network processor 2132 is configured to implement packet forwarding processing. A form of the network processor 2132 may be a forwarding chip. The forwarding chip may be a network processor (network processor, NP). In some embodiments, the forwarding chip may be implemented by using an application-specific integrated circuit (ASIC) or a field-programmable gate array (FPGA). Specifically, the network processor 2132 is configured to forward a received packet based on a forwarding table stored in the forwarding entry memory 2134. If a destination address of the packet is an address of the network device 2100, the network processor 2132 sends the packet to a CPU (for example, the central processing unit 2131) for processing. If a destination address of the packet is not an address of the network device 2100, the network processor 2132 searches for, based on the destination address, a next hop and an outbound interface corresponding to the destination address in the forwarding table, and forwards the packet to the outbound interface corresponding to the destination address. Processing on an uplink packet may include processing at a packet inbound interface and forwarding table lookup, and processing on a downlink packet may include forwarding table lookup and the like. In some embodiments, the central processing unit may also perform a function of the forwarding chip, for example, implement software forwarding based on a general-purpose CPU, so that the interface board does not need the forwarding chip.

The physical interface card 2133 is configured to implement a physical layer interconnection function. Original traffic enters the interface board 2130 from the physical interface card 2133, and a processed packet is sent out from the physical interface card 2133. The physical interface card 2133 is also referred to as a subcard and may be installed on the interface board 2130, and is responsible for converting an optoelectronic signal into a packet, performing validity check on the packet, and then forwarding the packet to the network processor 2132 for processing. In some embodiments, the central processing unit 2131 may alternatively perform a function of the network processor 2132, for example, implement software forwarding based on a general-purpose CPU, so that the physical interface card 2133 does not need the network processor 2132.

Optionally, the network device 2100 includes a plurality of interface boards. For example, the network device 2100 further includes an interface board 2140, and the interface board 2140 includes a central processing unit 2141, a network processor 2142, a forwarding entry memory 2144, and a physical interface card 2143. Functions and implementations of components in the interface board 2140 are the same as or similar to those of the interface board 2130, and details are not described herein again.

Optionally, the network device 2100 further includes a switching board 2120. The switching board 2120 may also be referred to as a switch fabric unit (SFU). When the network device has a plurality of interface boards, the switching board 2120 is configured to complete data exchange between the interface boards. For example, the interface board 2130 and the interface board 2140 may communicate with each other through the switching board 2120.

The main control board 2110 is coupled to the interface board. For example, the main control board 2110, the interface board 2130, the interface board 2140, and the switching board 2120 are connected to a system backboard through a system bus for interworking. In a possible implementation, an inter-process communication (IPC) channel is established between the main control board 2110 and the interface board 2130 and between the main control board 2110 and the interface board 2140, and communication between the main control board 2110 and the interface board 2130 and between the main control board 2110 and the interface board 2140 is performed through the IPC channel.

Logically, the network device 2100 includes a control plane and a forwarding plane. The control plane includes the main control board 2110 and the central processing unit 2111. The forwarding plane includes components used for forwarding, for example, the forwarding entry memory 2134, the physical interface card 2133, and the network processor 2132. The control plane performs the following functions: a router, generating a forwarding table, processing signaling and a protocol packet, configuring and maintaining a network device status, and the like. The control plane delivers the generated forwarding table to the forwarding plane. On the forwarding plane, the network processor 2132 searches the forwarding table delivered by the control plane, and then forwards, based on the table, a packet received by the physical interface card 2133. The forwarding table delivered by the control plane may be stored in the forwarding entry memory 2134. In some embodiments, the control plane and the forwarding plane may be totally separated, and are not on a same network device.

It should be noted that, there may be one or more main control boards. When there are a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there are a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented through the switching board, to provide a large-capacity data exchange and processing capability. Therefore, a data access and processing capability of a network device in the distributed architecture is better than that of a network device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of network device (for example, a network device such as a low-end switch or a router) has a weak data exchange and processing capability. A specific architecture that is to be used depends on a specific networking deployment scenario. This is not limited herein.

In a specific embodiment, the network device 2100 corresponds to the network simulation apparatus used for the network device shown in FIG. 7. In some embodiments, the obtaining module 701 in the network simulation apparatus shown in FIG. 7 is equivalent to the physical interface card 2133 in the network device 2100. The generation module 702, the change module 703, and the simulation module 704 in the network simulation apparatus shown in FIG. 7 are equivalent to the central processing unit 2111 or the network processor 2132 in the network device 2100.

An embodiment of this application further provides a communication system. The communication system includes the network device 2000 shown in FIG. 8 or the network device 2100 shown in FIG. 9.

For the method performed by the network device, refer to related descriptions in the embodiments shown in FIG. 3 and FIG. 5. Details are not described herein again.

It should be understood that the processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor or any conventional processor or the like. It should be noted that the processor may be a processor that supports an advanced reduced instruction set computing machine (advanced RISC machine, ARM) architecture.

Further, in an optional embodiment, the memory may include a read-only memory and a random access memory, and provide instructions and data for the processor. The memory may further include a nonvolatile random access memory. For example, the memory may further store information of a device type.

The memory may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitation, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data date SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

A computer-readable storage medium is further provided. The storage medium stores at least one instruction, and a processor loads and executes the instruction to implement either of the foregoing network management methods.

This application provides a computer program. When the computer program is executed by a computer, a processor or the computer is enabled to perform corresponding steps and/or procedures in the foregoing method embodiments.

A chip is provided. The chip includes a processor, configured to: invoke, from a memory, instructions stored in the memory and run the instructions, so that a communication device on which the chip is installed performs the methods according to the foregoing aspects.

Another chip is provided. The chip includes an input interface, an output interface, a processor, and a memory. The input interface, the output interface, the processor, and the memory are connected to each other through an internal connection channel. The processor is configured to execute code in the memory. When the code is executed, the processor is configured to perform the methods according to the foregoing aspects.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk), or the like.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions of this application shall fall within the protection scope of this application.

A person of ordinary skill in the art may be aware that, with reference to the method steps and the modules described in embodiments disclosed in this specification, implementation can be performed by using software, hardware, firmware, or a combination thereof. To clearly describe the interchangeability between the hardware and the software, the foregoing has usually described steps and composition of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

When software is used to implement embodiments, all or some of embodiments may be implemented in a form of a computer program product. The computer program product includes one or more computer program instructions. For example, the methods in embodiments of this application may be described in a context of machine-executable instructions. The machine-executable instructions are, for example, a program module executed in a device included in a real or virtual processor of a target. Usually, the program module includes a routine, a program, a library, an object, a class, a component, a data structure, and the like, and executes a specific task or implements a specific abstract data structure. In various embodiments, functions of program modules may be combined or split between the described program modules. The machine-executable instructions for the program module may be executed locally or within a distributed device. In the distributed device, the program module may be located in both a local storage medium and a remote storage medium.

Computer program code used to implement the methods in embodiments of this application may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server.

In a context of embodiments of this application, the computer program code or related data may be carried on any appropriate carrier, so that a device, an apparatus, or a processor can perform various processing and operations described above. Examples of the carrier include a signal, a computer-readable medium, and the like.

Examples of the signal may include propagating signals in electrical, optical, radio, sound, or other forms, such as carrier waves and infrared signals.

The computer-readable medium may be any tangible medium that includes or stores a program used for or related to an instruction execution system, apparatus, or device. The machine-readable medium may be a machine-readable signal medium or a machine-readable storage medium. The machine-readable medium may include but is not limited to an electronic, magnetic, optical, electromagnetic, infrared, or semiconductor system, apparatus, or device, or any suitable combination thereof. More detailed examples of the machine-readable storage medium include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any suitable combination thereof.

It may be clearly understood by a person skilled in the art that, for the purpose of convenient and brief description, for a detailed working process of the foregoing system, device, and module, refer to a corresponding process in the foregoing method embodiment. Details are not described herein.

In the several embodiments provided in this application, it should be understood that the disclosed system, device, and method may be implemented in other manners. For example, the described device embodiment is merely an example. For example, division into the modules is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented through some interfaces. Indirect couplings or communication connections between the devices or modules may be electrical connections, mechanical connections, or connections in other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions in embodiments of this application.

In addition, functional modules in embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory, ROM), a random access memory (RAM), a magnetic disk, or an optical disc.

In this application, the terms "first", "second", and the like are used to distinguish between same or similar items whose effects and functions are basically the same. It should be understood that there is no logical or time-sequence dependency between "first", "second", and "n$^{th}$", and a quantity and an execution sequence are not limited. It should be further understood that although terms such as "first" and "second" are used in the following descriptions to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

In this application, the term "at least one" means one or more, and the term "a plurality of" means two or more. For example, a plurality of second packets mean two or more second packets. The terms "system" and "network" may be often used interchangeably in this specification.

It should be understood that the terms used in the descriptions of various examples in this specification are merely intended to describe specific examples, but are not intended to constitute a limitation. The terms "one" ("a" and "an") and "the" of singular forms used in the descriptions of various examples and the appended claims are also intended to include plural forms, unless otherwise specified in the context clearly.

It should be further understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should be further understood that the term "if" may be interpreted as a meaning "when" ("when" or "upon"), "in a case of determining", or "in a case of detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that determining B based on A does not mean that B is determined based on only A, but B may alternatively be determined based on A and/or other information.

It should be further understood that "one embodiment", "an embodiment", or "a possible implementation" mentioned throughout this specification means that particular features, structures, or characteristics related to embodiments or implementations are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments in any appropriate manner.

The foregoing descriptions are merely optional embodiments of this application, but are not intended to limit this application. Any modification, equivalent replacement, or improvement made without departing from the principle of this application should fall within the protection scope of this application.

What is claimed is:

1. A network simulation method, wherein the method comprises:
    obtaining, by a network management device, network data of a current network;
    determining a simulation network based on the network data of the current network;
    changing the simulation network based on a simulation change instruction, to obtain data of a changed simulation network; and
    obtaining a connectivity simulation result based on the data of the changed simulation network and a connectivity simulation input parameter, the connectivity simulation result indicating whether a destination internet protocol (IP) address is reachable from a source IP address, based on data of the changed simulation network, a first parameter of the destination IP address, and a second parameter of the source IP address.

2. The method according to claim 1, wherein the obtaining a connectivity simulation result based on the data of the changed simulation network and a connectivity simulation input parameter comprises:
    importing the data of the changed simulation network and the connectivity simulation input parameter into a simulation engine, wherein the simulation engine is configured to obtain the connectivity simulation result based on the data of the changed simulation network and the connectivity simulation input parameter; and
    obtaining the connectivity simulation result from the simulation engine.

3. The method according to claim 1, wherein the connectivity simulation input parameter comprises the source IP address and the destination IP address, and the obtaining a connectivity simulation result based on the data of the changed simulation network and a connectivity simulation input parameter comprises:
    generating a route forwarding entry based on the data of the changed simulation network; and
    determining a connectivity simulation result between the source IP address and the destination IP address based on the route forwarding entry and device configuration data in the data of the changed simulation network.

4. The method according to claim 3, wherein the connectivity simulation result comprises a first connectivity simulation result and a mutual access path between the source IP address and the destination IP address, and the first connectivity simulation result indicates reachability between the source IP address and the destination IP address; or
    the connectivity simulation result comprises a second connectivity simulation result and interruption location information, and the second connectivity simulation result indicates unreachability between the source IP address and the destination IP address.

5. The method according to claim 1, wherein the simulation change instruction comprises at least one of an instruction used to add a network device, an instruction used to delete a network device, an instruction used to add a link, an instruction used to delete a link, an instruction used to modify an interface of a link, or an instruction used to change a device configuration.

6. The method according to claim 1, wherein the network data of the current network comprises network topology data, device configuration data, and device type data of the current network; and
    the data of the changed simulation network comprises network topology data, device configuration data, and device type data of the changed simulation network.

7. An apparatus, wherein the apparatus comprises:
    at least one processor;
    at least one non-transitory computer-readable storage medium storing a program to be executed by the at least one processor, the program including instructions to:
    obtain network data of a current network;
    determine a simulation network based on the network data of the current network;
    change the simulation network based on a simulation change instruction, to obtain data of a changed simulation network; and
    obtain a connectivity simulation result based on the data of the changed simulation network and a connectivity simulation input parameter, the connectivity simulation result indicating whether a destination IP address is reachable from a source Internet Protocol address, based on data of the changed simulation network, a first parameter of the destination IP address, and a second parameter of the source IP address.

8. The apparatus according to claim 7, wherein the instructions further include instructions to:
    import the data of the changed simulation network and the connectivity simulation input parameter into a simulation engine, wherein the simulation engine is configured to: obtain the connectivity simulation result based on the data of the changed simulation network and the connectivity simulation input parameter; and obtain the connectivity simulation result from the simulation engine.

9. The apparatus according to claim 8, wherein the connectivity simulation input parameter comprises the source IP address and the destination IP address, wherein the instructions further include instructions to:
    generate a route forwarding entry based on the data of the changed simulation network; and
    determine a connectivity simulation result between the source IP address and the destination IP address based on the route forwarding entry and device configuration data in the data of the changed simulation network.

10. The apparatus according to claim 9, wherein the connectivity simulation result comprises a first connectivity simulation result and a mutual access path between the source IP address and the destination IP address, and the first connectivity simulation result indicates reachability between the source IP address and the destination IP address; or
    the connectivity simulation result comprises a second connectivity simulation result and interruption location information, and the second connectivity simulation result indicates unreachability between the source IP address and the destination IP address.

11. The apparatus according to claim 7, wherein the simulation change instruction comprises at least one of an instruction used to add a network device, an instruction used to delete a network device, an instruction used to add a link, an instruction used to delete a link, an instruction used to modify an interface of a link, and an instruction used to change a device configuration.

12. The apparatus according to claim 7, wherein the network data of the current network comprises network topology data, device configuration data, and device type data of the current network; and
    the data of the changed simulation network comprises network topology data, device configuration data, and device type data of the changed simulation network.

13. A non-transitory storage medium storing a program, which when executed by one or more processors, cause the one or more processors to perform operations, the operations comprising:

obtaining, by a network management device, network data of a current network;

determining a simulation network based on the network data of the current network;

changing the simulation network based on a simulation change instruction, to obtain data of a changed simulation network; and obtaining a connectivity simulation result based on the data of the changed simulation network and a connectivity simulation input parameter, the connectivity simulation result indicating whether a destination IP address is reachable from a source IP address, based on data of the changed simulation network, a first parameter of the destination IP address, and a second parameter of the source IP address.

14. The non-transitory storage medium according to claim 13, wherein the operations further comprise:

importing the data of the changed simulation network and the connectivity simulation input parameter into a simulation engine, wherein the simulation engine is configured to obtain the connectivity simulation result based on the data of the changed simulation network and the connectivity simulation input parameter; and obtaining the connectivity simulation result from the simulation engine.

15. The non-transitory storage medium according to claim 13, wherein the operations further comprise:

generating a route forwarding entry based on the data of the changed simulation network; and determining a connectivity simulation result between the source IP address and the destination IP address based on the route forwarding entry and device configuration data in the data of the changed simulation network.

16. The non-transitory storage medium according to claim 15, wherein the connectivity simulation result comprises a first connectivity simulation result and a mutual access path between the source IP address and the destination IP address, and the first connectivity simulation result indicates reachability between the source IP address and the destination IP address; or the connectivity simulation result comprises a second connectivity simulation result and interruption location information, and the second connectivity simulation result indicates unreachability between the source IP address and the destination IP address.

17. The non-transitory storage medium according to claim 13, wherein the simulation change instruction comprises at least one of an instruction used to add a network device, an instruction used to delete a network device, an instruction used to add a link, an instruction used to delete a link, an instruction used to modify an interface of a link, or an instruction used to change a device configuration.

18. The non-transitory storage medium according to claim 13, wherein the network data of the current network comprises network topology data, device configuration data, and device type data of the current network; and the data of the changed simulation network comprises network topology data, device configuration data, and device type data of the changed simulation network.

19. The method according to claim 1, further comprising:

determining, based on the connectivity simulation result the destination IP address is reachable from the source IP address; and in response to determining that the destination IP address is reachable from the source IP address, implementing a network change on the current network.

20. The apparatus according to claim 7, wherein the instructions further include instructions to:

determine, based on the connectivity simulation result the destination IP address is reachable from the source IP address; and in response to determining that the destination IP address is reachable from the source IP address, implement a network change on the current network in accordance with the simulation change instruction.

* * * * *